United States Patent
Rankov et al.

(10) Patent No.: US 9,596,292 B1
(45) Date of Patent: Mar. 14, 2017

(54) CLIENT-SIDE SCRIPTS IN A SERVICE-ORIENTED API ENVIRONMENT

(75) Inventors: Alex Rankov, Danville, CA (US); Victor Spivak, San Mateo, CA (US); Donald Peter Robertson, Pleasanton, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 2476 days.

(21) Appl. No.: 11/890,306

(22) Filed: Aug. 3, 2007

(51) Int. Cl.
*G06F 15/173* (2006.01)
*H04L 29/08* (2006.01)

(52) U.S. Cl.
CPC .................................. *H04L 67/10* (2013.01)

(58) Field of Classification Search
CPC ......... H04L 67/34; H04L 67/40; H04L 67/10; G06F 9/547; G06F 9/548; G06F 9/465; G06F 3/00
USPC ........................................................ 709/226
See application file for complete search history.

(56) References Cited

U.S. PATENT DOCUMENTS

| | | | |
|---|---|---|---|
| 6,185,625 B1 * | 2/2001 | Tso et al. | 709/247 |
| 6,615,253 B1 * | 9/2003 | Bowman-Amuah | 709/219 |
| 8,386,608 B1 * | 2/2013 | Rankov et al. | 709/226 |
| 2002/0129129 A1 * | 9/2002 | Bloch et al. | 709/220 |
| 2003/0084350 A1 * | 5/2003 | Eibach et al. | 713/201 |
| 2005/0027871 A1 * | 2/2005 | Bradley et al. | 709/227 |
| 2005/0251853 A1 * | 11/2005 | Bhargavan et al. | 726/1 |
| 2006/0031441 A1 * | 2/2006 | Davis et al. | 709/223 |
| 2006/0090006 A1 * | 4/2006 | Wu | 709/238 |
| 2006/0123025 A1 * | 6/2006 | DeMello et al. | 707/100 |
| 2006/0235732 A1 * | 10/2006 | Miller et al. | 705/7 |
| 2007/0156702 A1 * | 7/2007 | Jain | 707/10 |
| 2007/0180490 A1 * | 8/2007 | Renzi et al. | 726/1 |
| 2007/0250840 A1 * | 10/2007 | Coker et al. | 719/320 |
| 2007/0294312 A1 * | 12/2007 | Seshadri et al. | 707/200 |
| 2007/0294525 A1 * | 12/2007 | Janes | 713/151 |
| 2007/0300236 A1 * | 12/2007 | Hing | 719/315 |
| 2012/0260353 A1 * | 10/2012 | Raley et al. | 726/29 |
| 2014/0075206 A1 * | 3/2014 | Garcia et al. | 713/193 |

* cited by examiner

*Primary Examiner* — June Sison
(74) *Attorney, Agent, or Firm* — Van Pelt, Yi & James LLP

(57) ABSTRACT

Use of client-side scripts in a service-oriented API environment is disclosed. A communication that includes a script sent by a service in response to a service request sent by a client to the service is received and executed at the client. In various embodiments, client-side scripts sent by a service are used to apply a policy and/or to cause the client to perform at the client required pre- and/or post-processing with respect to a services response.

18 Claims, 9 Drawing Sheets

CLIENT-SIDE SCRIPTS IN A SERVICE-ORIENTED API ENVIRONMENT

BACKGROUND OF THE INVENTION

Service-oriented architectures, such as web services and similar frameworks, have been employed to provide access, e.g., via a network, to a service. One example of such a service-oriented architecture is the EMC Documentum™ family of products, which provide content management-related services. A service-oriented architecture typically is used to define and provide access to a collection of services. A service is an endpoint capable of being connected to, e.g., via a network, and typically comprises a function that is well defined, self contained, and does not depend on the context or state of other services; although a service may invoke one or more other services in order to generate a response to a service request. A service typically is invoked via a service interface, e.g., a SOAP or other web services request. In the web services or similar paradigms, a definition of a service may be made available, through public posting or otherwise, to describe a service and the syntax required to be used to invoke the services and/or its component operations. To facilitate machine-to-machine discovery and use, a service typically is defined in advance, relatively statically, and typically comprises a relatively small number of atomic operations. A typical service responds to requests received from service consumers, sometimes referred to herein as services clients, and typically does not have visibility into or control over the configuration and/or operation of the client or its host.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Sending to a service consumer, such as a client side runtime associated with the service, in response to a service request, a client side script associated with the service request, to be executed by the service consumer to cause the service consumer host to perform a client side processing required by or otherwise associated with the service request, is disclosed. In some embodiments, the script is sent to and executed at the client in a manner transparent to a requesting application or process that generated the service request. In some embodiments, the script is sent prior to processing and/or returning a response to the service request. Examples of such client side scripts include scripts configured to determine and/or verify compliance with a policy, such as a policy requiring that the client be configured in a prescribed way, and scripts configured to cause the client to perform post-processing, such as unzipping or otherwise decompressing a service response, prior to forwarding the service response to an application or other client process that generated the service request.

Figure 1:
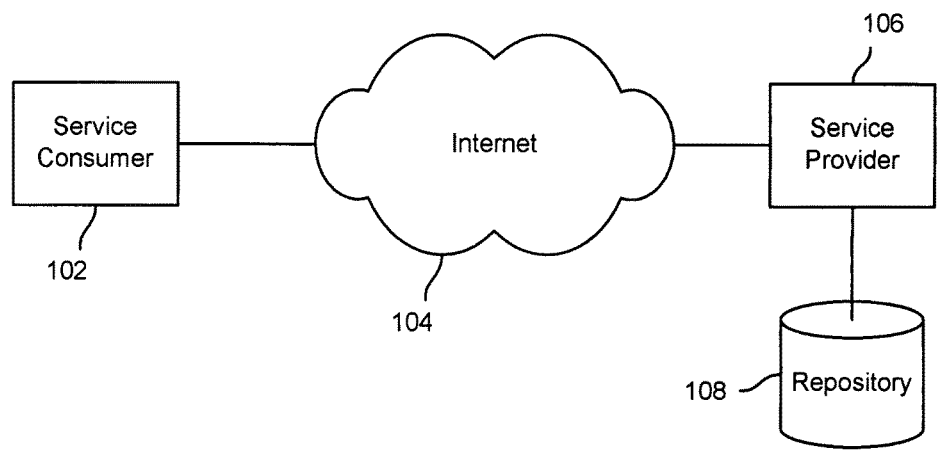
FIG. 1 is a block diagram illustrating an embodiment of a service-oriented architecture for content management services.

FIG. 1 is a block diagram illustrating an embodiment of a service-oriented architecture for content management services. In the example shown, a service consumer host 102 communicates via the Internet 104 with a service provider host 106. Service provider host 106 in turn communicates, e.g., via a public or private network or other connection, with a managed content repository 108. Examples of repository 108 include an EMC Documentum™ repository. Examples of content management services include adding new content to repository 108; retrieving, updating, deleting, or otherwise accessing, using, and/or manipulating content stored in repository 108; and providing traditional content management related services, such as managing retention, promoting content through stages of a lifecycle or other business process, etc.

Figure 2:
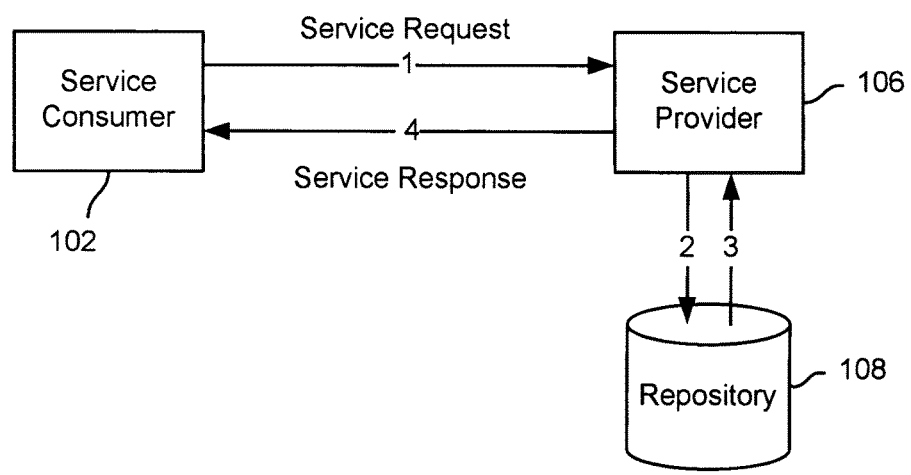
FIG. 2 is a block diagram illustrating an embodiment of a service-oriented architecture for content management services.

FIG. 2 is a block diagram illustrating an embodiment of a service-oriented architecture for content management services. In the example shown, service consumer host 102 sends a service request (arrow "1") to service provider host 106. Examples of a content management related service request include a request to create (store) a new object in the repository; a request to relate a first object with a second object; a request to associate an object with a folder or other logical structure; and requests to update, delete, or otherwise modify an object stored in the repository. The service provider host 106 sends a command (arrow "2") to repository 108 to cause the repository 108 to perform a task associated with responding to the service request ("1"). The repository returns a result (arrow "3") to service provider host 106, which uses the result to generate and send to service consumer host 102 a service response (arrow "4") to the service request ("1"). For example, if the service request "1" requested that a new object be created and associated content stored in repository 108, the command "2" in some embodiments would include a command to store the content and create an associated metadata object to represent and manage the content as stored in repository 108. The repository 108 would in some embodiments assign and include in result "3" an object identifier of the newly-created content object, and service provider host 106 would include the identifier in the service response "4" sent to the service consumer host 102.

Figure 3:
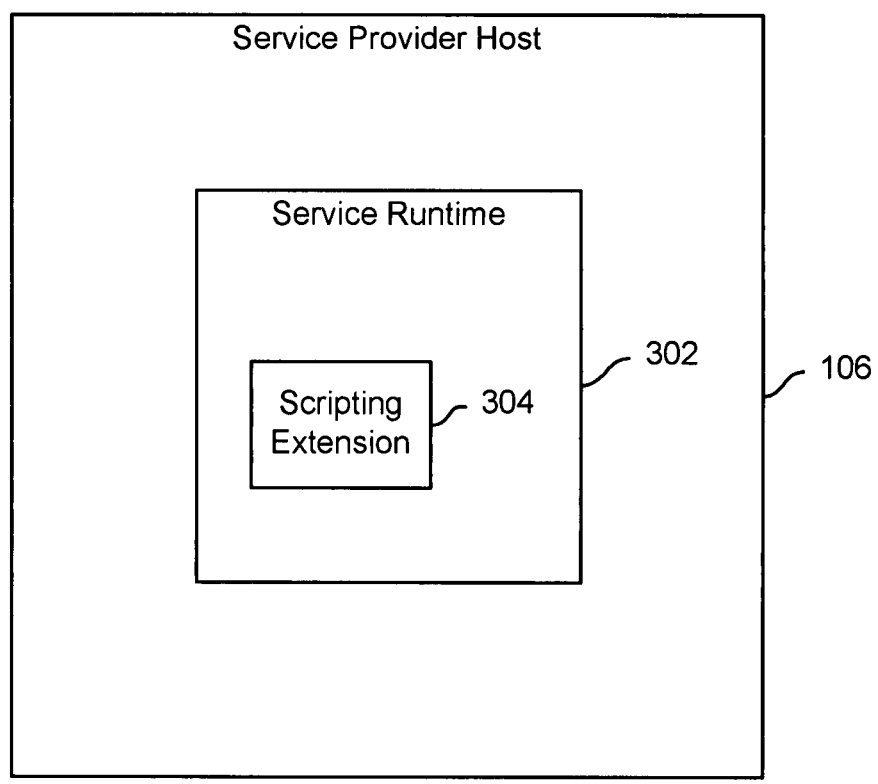
FIG. 3 is a block diagram illustrating an embodiment of a service provider host.

FIG. 3 is a block diagram illustrating an embodiment of a service provider host. In the example shown, service provider host 106 includes a service runtime environment 302 in which one or more services and/or associated processes run. In various embodiments, service runtime environment 302 comprises a virtual machine and provides access to services via a contained and optimized environment. Service consumers connect to services running in service runtime environment 302, send service requests to such services, and receive responses generated and sent by such services. In the example shown, the services runtime environment 302 includes a scripting extension 304 configured to support (e.g., interpret and execute) at least limited scripts. Examples of a scripting extension include extensions configured to interpret and execute, within the confines of services runtime environment 302, scripts written in languages such as Python, JavaScript, Ruby, and Visual Basic.

A service consumer, such as a service client, sends a request that includes a script and in some embodiments an indication that a script is included. Rather than simply processing the request as a normal services request, in accordance with the service definition, if the request includes an indication that a script is included the request, or at least the script portion thereof, is handed to the scripting extension 304, which interprets and executes the script. In various embodiments, the script may cause the services runtime 302 and/or another component comprising and/or running on service provider host 106 to perform one or more of the following: pre-processing the request and/or a payload portion thereof, for example by unzipping the request using a prescribed tool and/or algorithm; causing the service to perform one or more operations of the service and then post-processing all or part of the result prior to its being returned to the service consumer that sent the request, for example by zipping and/or encrypting all or part of the response or by unzipping or decrypting a part of the response that was received from another node, such as another service, in a compressed (i.e., zipped) or encrypted form that the client cannot or might not be able to use; and replacing a service operation with an operation defined at least in part in the script.

In some embodiments only certain scripts are allowed and scripting extension 304 includes a validation module that verifies that a received script is permitted prior to its being executed. In some embodiments such limiting and validation of scripts ensures a service request does not include a script that could pose a security threat to the service, the service runtime 302, and/or the service provider host 106. In some embodiments, the scripting extension 304 comprises an interface to a predefined processing module on the service provider host 106. Examples of such a module include a business process module configured to manage the progression of one or more items of content through one or more steps in a business process, for example, validation, promotion for review and approval, retrieval of additional data from local or external sources, generation of output, triggering related business processes and/or other services, retention management, etc. In some embodiments, scripting is limited to invoking the services available from one or more such predefined modules and/or components at least in part to prevent such a script from compromising the service, the service runtime 302, and/or the service provider host 106.

Figure 4:
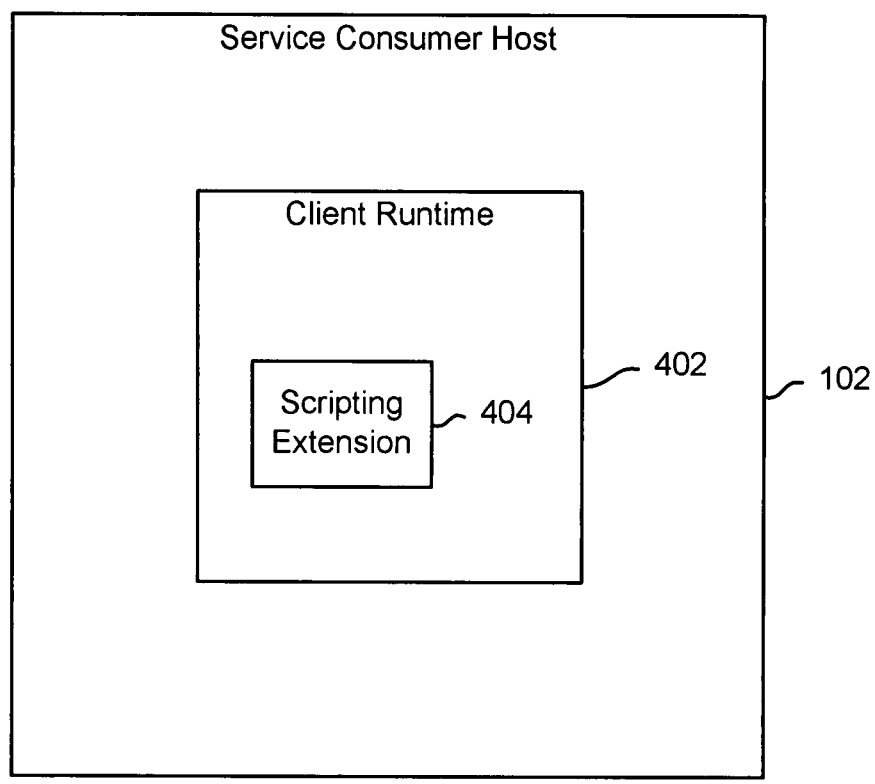
FIG. 4 is a block diagram illustrating an embodiment of a service consumer host.

FIG. 4 is a block diagram illustrating an embodiment of a service consumer host. In the example shown, service consumer host 102 includes a client runtime environment 402. An application and/or other process running in client runtime environment 402 in some embodiments uses components, modules, facilities, and/or interfaces associated with client runtime environment 402 to generate and send service requests. In the example shown, the client runtime environment 402 includes a scripting extension 404. In some embodiments, scripting extension 404 facilitates the inclusion of at least limited scripts in service requests sent to remote services, as described above. In some embodiments, as described more fully below, scripting extension 404 allows at least certain scripts included in service responses to be interpreted and executed at service consumer host 102. Examples of such client-side scripts include scripts configured to apply at the client, in some embodiments transparently to the client and/or applications and/or other processes running on the client, a policy. One example of such a policy is a policy requiring that certain content can be provided to a client in response to a service request only if the client has a properly configured secure location in which to store the content. In some embodiments, upon receiving a service request for such content the server sends to the client a script configured to verify the client is configured to store the content in a properly secured storage location, waits to receive an indication that the verification has been performed with a satisfactory result, and only then sends a service response that includes and/or otherwise provides access to the requested content. In some embodiments, from the perspective of the application and/or other process that sent the service request, the receipt and execution of the script is transparent and the above interaction is indistinguishable from the service request-service response model illustrated by FIG. 2. Other examples of a client-side script is one configured to cause the client to perform post-processing, such as unzipping a service response or portion thereof using an indicated or provided tool and/or algorithm, and scripts configured to enable a service request sent in encrypted form to be decrypted at the client, e.g., by providing or providing a link or pointer to a secret data, such as a key, required to decrypt the response, etc.

Figure 5:
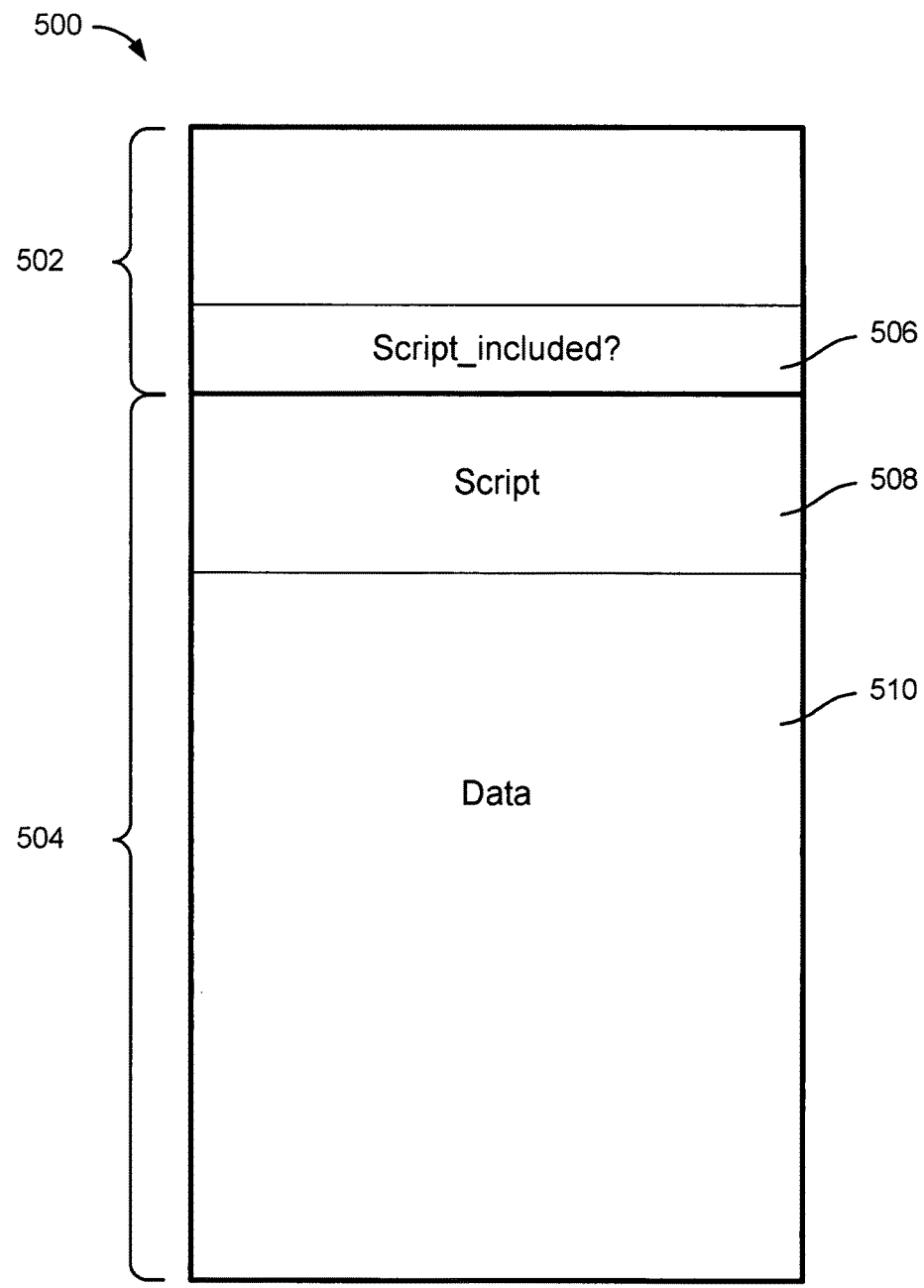
FIG. 5 is a block diagram illustrating an embodiment of a data package used to send a service request in some embodiments.

FIG. 5 is a block diagram illustrating an embodiment of a data package used to send a service request in some embodiments. In the example shown, a data package 500 includes a header portion 502 and a body portion 504. The header portion 502 includes a script included flag, bit, or field 506 in which data indicating whether the data package 500 includes a script is provided. If a script is included, in the example shown the script itself is included in a script portion 508 of body portion 504. A data payload, for example new or updated content data in the content management context, is included in a data portion 510 of the body portion 504. In some embodiments, the data portion 510 may included in addition to and/or instead of content data one or more operations, commands, instructions, or other indications of processing and/or services desired to be performed. In some embodiments, a script included in a data package such as data package 500 may be configured to cause one or more operations indicated in data portion 510 to be performed with respect to content data included in data portion 510, e.g., in a prescribed order and/or manner defined in and/or by the script. For example, an instance of data package 500 may include a script configured to invoke first a first operation to create a new repository object A associated with a new content data A included in the data package, receive an object identifier generated in connection with creation of the new repository object A, and then use the received object identifier to invoke a second operation to relate the repository object A to another, existing object, and/or to link the new repository object A to a folder or other logical structure, etc.

Figure 6:
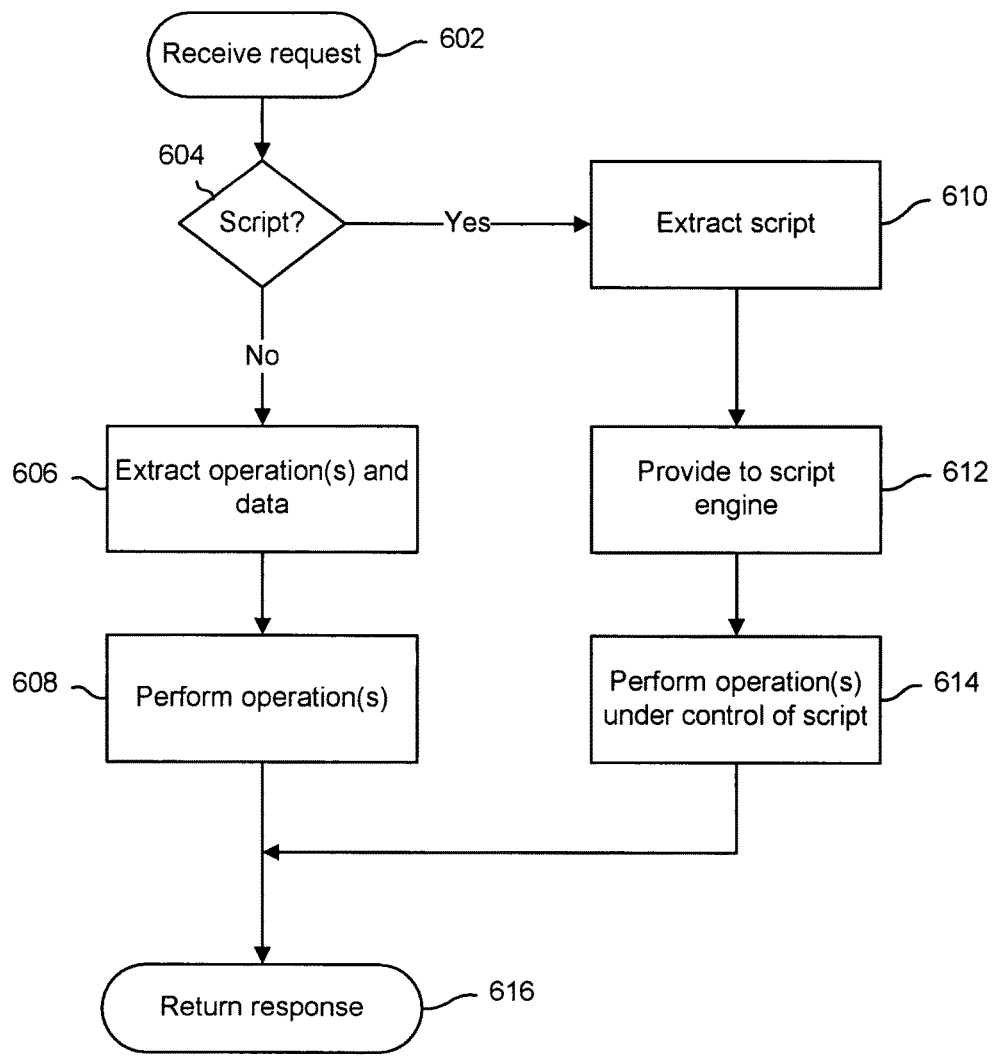
FIG. 6 is a flow chart illustrating an embodiment of a process for responding to a service request.

FIG. 6 is a flow chart illustrating an embodiment of a process for responding to a service request. In the example shown, upon receiving a service request (602) a determination is made as to whether the request includes a script (604). If not, the service request is processed normally, in accordance with the corresponding service definition, in this example by extracting one or more operations and associated data from the received request (606) and performing the one or more operations (608), e.g., with respect to the data, as applicable. If the request includes a script (604), the script is extracted from the request (610), e.g., from a location such as script portion 508 of data package 500 of FIG. 5. The script is provided (612) to a script engine, extension, or other component configured to interpret and execute the script, and one or more operations are performed under the control of the script (614). In some embodiments, the script invokes, sequentially if required, one or more atomic operations of the service, in the same manner as the one or more atomic operations might be invoked by a remote client via a corresponding sequence of service requests, each requesting a subset of the one or more atomic operations, e.g., each one requesting a single operation. Once the required operation(s) has/have been performed, either directly in response to the request (606, 608) or under control of the script (610-614), an appropriate service response is returned (616) to the service consumer from which the request was received.

Figure 7:
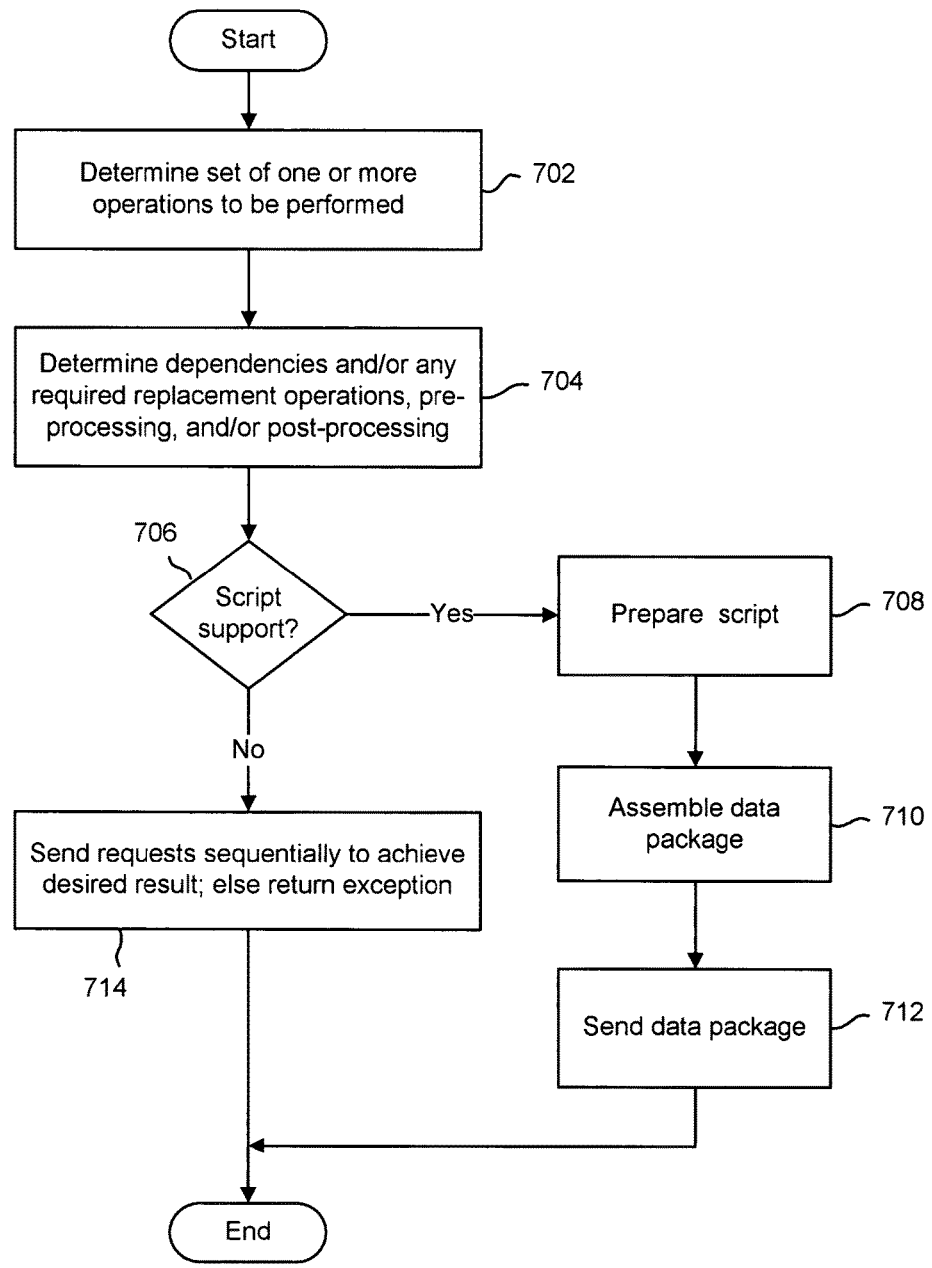
FIG. 7 is a flow chart illustrating an embodiment of a process for preparing and sending a service request.

FIG. 7 is a flow chart illustrating an embodiment of a process for preparing and sending a service request. In various embodiments, the process of FIG. 7 is implemented by a client runtime such as client runtime 402 of FIG. 4 and/or an application or other process running thereon. A determination is made that one or more operations available from a service are required to be performed (702). For example, an application or other process running in a client runtime environment such as client runtime environment 402 of FIG. 4 may determine that one or more content management operations made available via a service-oriented architecture are required to be performed, such as creating a new repository object and relating the object to another object, as described in an example above. Dependencies between and among the required operations, pre- and/or post-processing required or desired to be performed at the server, and/or replacement operations to be substituted for operations of the service are determined (704). For example, the application or other process running at the client may be configured to compress (e.g., zip) data prior to sending it via a network communication to a service configured to stored content data in an associated repository, and in such an embodiment 704 may include determining that the service would have to be told to and/or how to unzip the file. Or, in the "create" and then "relate" example described above, 704 may include recognizing that the relate operation cannot be invoked until the object identifier that will be generated and returned in the course of performing the create operation. An example of a situation in which it may be desirable to use a script to replace an operation is a script configured to substitute an "update" operation for a "create" operation if an indication is received that a repository object originally thought to be required to be created has already been created, e.g., in response to a prior and/or concurrently sent/received request generated by another service consumer and/or other requesting process.

It is determined whether there is script support at the service (706), such that a script configured to manage dependencies, cause required pre- and/or post-processing to be done, and/or replace any service operation(s) required to be replaced can be included in and/or associated with the service request to cause any such processing to be done at the server. If so, an appropriate script is prepared (708), a data package that includes the script is assembled (710), and the data package is sent to the service (712), e.g., as or in connection with a service request. In some embodiments, scripting is limited to invoking one or more scripts or portions thereof as exist in a limited library installed and available at the service provider host and/or a service runtime environment provided thereon. If it is determined there is not scripting support at the service, or if there is support for limited scripting but not a script such as would be required to cause the server to perform processing determined at 704 to be required, the required operation(s) are requested, if possible, in a manner that enables a desired end result to be achieved without such script support on the service side (714). For example, a sequence of services requests, each requesting a single atomic operation, may be sent, in lieu of package in a data package a series of operations and associated data to be performed at the server under management and/or control of a script. In the "create" and then "relate" example described above for example, a first service request to cause the create operation to be performed may be sent by the client and a service response returned that includes an object identifier assigned to the created object. Subsequently, a second service request in which the object identifier included in the response to the first service request is used to identify the newly create object as the subject of the desired "relate" operation is prepared and sent, to cause the relate operation to be performed. Or, in some embodiments if it is determined that scripting is not supported at the service a request or portion thereof that otherwise would have been compressed (e.g., zipped) prior to sending in some embodiments may be sent instead in uncompressed form. In the example shown, an exception (e.g., error) is returned if scripting is not supported and the client side application or other process cannot achieve the same desired result and/or cannot comply with a mandatory policy (e.g., that requests be sent in compressed and/or encrypted form) without scripting support at the service. In some embodiments, at least limited scripting is supported in all cases and 706 and 714 are omitted from the process of FIG. 7.

Figure 8:
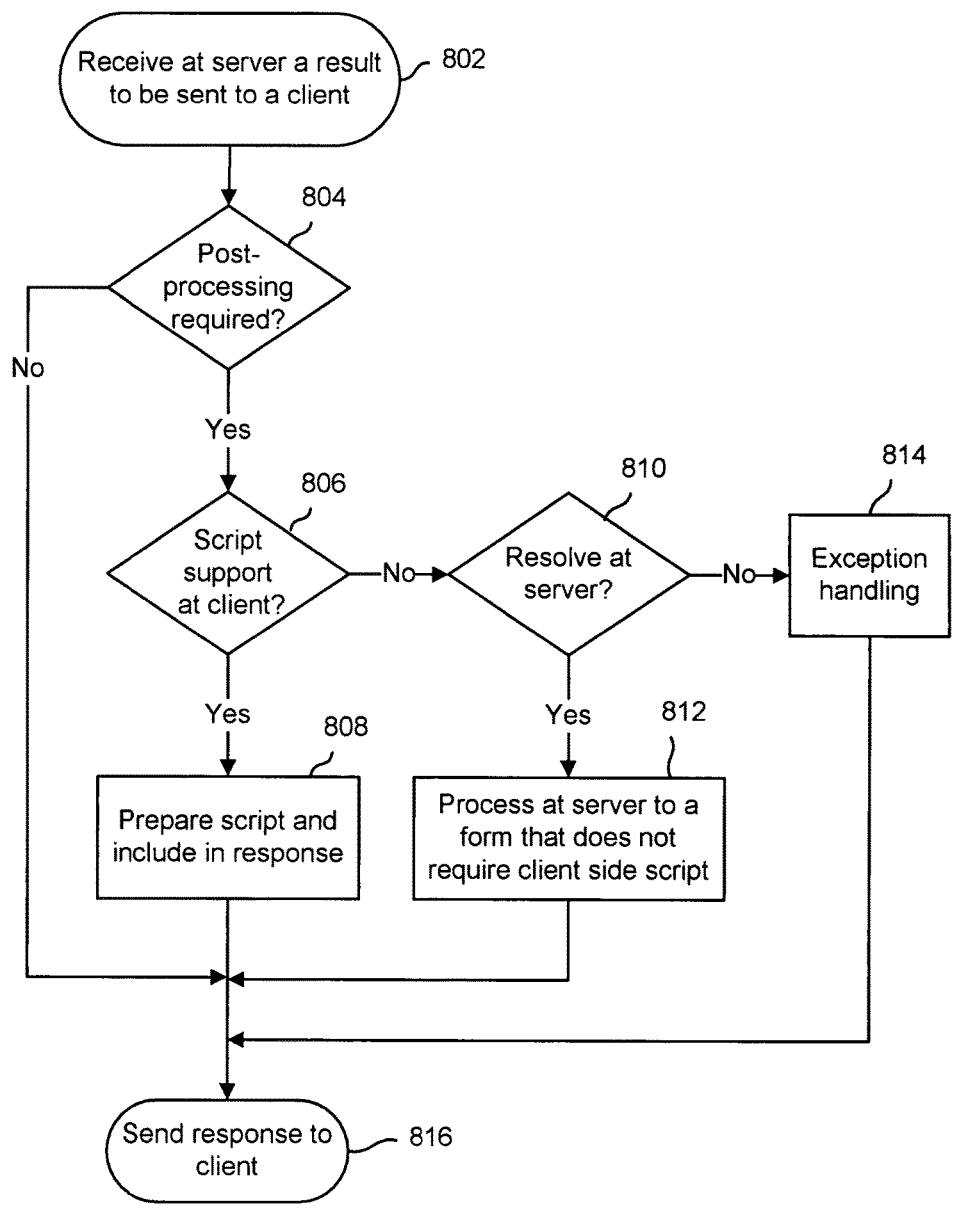
FIG. 8 is a flow chart illustrating an embodiment of a process for preparing and sending a service response.

FIG. 8 is a flow chart illustrating an embodiment of a process for preparing and sending a service response. In the example shown, a result required to respond to a service request is received (802). Examples of such a result include the output or other result of processing performed locally by the service and/or a related process; a response received from a local or remote repository such as repository, such as repository 108, in a content management context; and a response received from another service invoked to be able to respond to the service request received from the client. Note that the client from which the request was received may in some embodiments itself be a service. It is determined whether the result or any portion thereof is required to be post-processed in order to be in a form that is usable by a requesting application or process with which the service request is associated (804). For example, if the result were in a compressed (e.g., zipped) form, in some embodiments the determination made at 804 would include determining whether the service consumer would know to and/or how to decompress the result. If post-processing is determined to be required (804), it is determined whether there is scripting support at the client (806), e.g., whether an associated client runtime environment includes a scripting extension such as described above. If scripting support is determined to be available at the client (806), a script that when executed at the client will perform the required post-processing is prepared and included with the service response (808). If post-processing is determined to be required (804) but scripting support has been determined to not be available at the client (806), it is determined whether the need for post-processing can be resolved at the server (810). For example, at 810 in some embodiments and/or circumstances it may be determined whether required post-processing, such as decompressing and/or decrypting data, can be performed at the server prior to sending the data to the client in a service response. Considerations may include whether it is possible to do such processing at the server prior to sending the response, and whether applicable policies and/or other rules or restrictions allow the response to include data sent in the post-processed form. Another example of resolving at the responding server a need that would otherwise exist for post-processing to be done at the client is not compressing and/or not encrypting at the server a response data that would otherwise have been compressed and/or encrypted had the client been configured to support scripting. If the need for post-processing can be resolved at the server (810), associated processing required to be performed at the server is done at the server (812). If the need for post-processing cannot be resolved at the server (810), exception handling is invoked (814) after which the process of FIG. 8 ends. Examples of exception handling include sending an error message to the requesting client, prompting human intervention at the client and/or server side, generating an alert, etc. Once a response has been prepared (804, if no post-processing is required; 808 if a client side script to perform post-processing at the client side is included; 812 if the need for client side post-processing is obviated by the server; and 814 if the case of exception handling), the response is sent to the requesting client (816).

Figure 9:
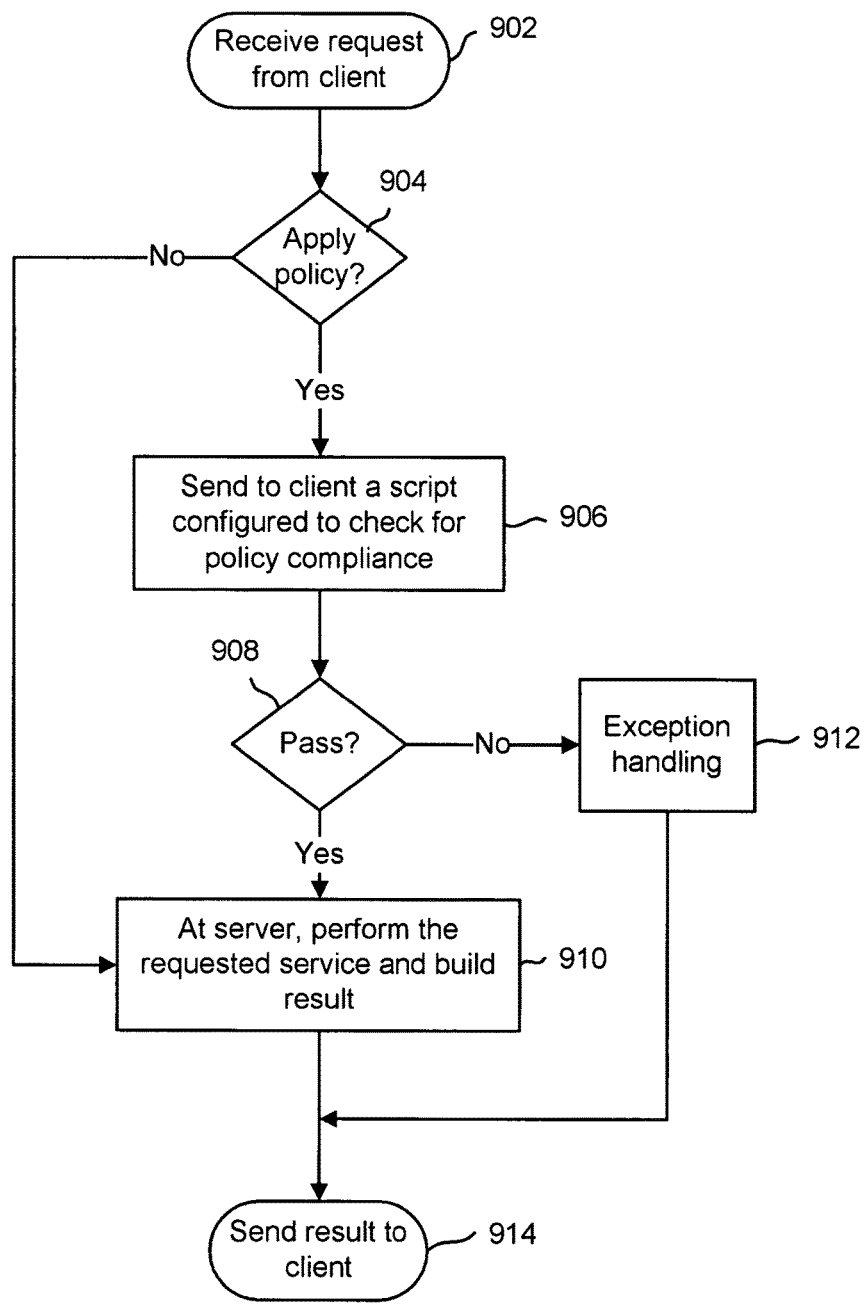
FIG. 9 is a flow chart illustrating an embodiment of a process for using a client side script to apply a policy implicated by a service request.

FIG. 9 is a flow chart illustrating an embodiment of a process for using a client side script to apply a policy implicated by a service request. A service request is received (902). It is determined whether the received request requires a policy to be applied with respect to the client (904). Examples of such a policy include a security policy, such as one requiring that the client host be configured to store requested content data in a secure (e.g., encrypted) manner and/or whether required security applications and/or tools are installed at the client host; and a communication policy, such as one that allows an email or other transmission or communication to be sent to or from a client host that is physically located at a secure site but not to or from, as applicable, one that is not and/or cannot be verified to be so located, such as a laptop or other portable computer. If a policy is to be applied (904), a client side script configured to apply the policy, e.g., one configured to determine whether secured storage is available and/or required software installed in the example above, is sent to the client (906). If the script sends to the server a result indicating the client is in compliance with the policy (908) the service requested in the service request received at 902 is performed. If the client does not pass, exception handling is invoked (912). Examples of exception handling include returning an error, generating an alert, prompting a human interaction, etc. Once a response is ready and/or an error or other exception message generated (910, 912), a service response is sent to the client (914). In some embodiments, the client side script, associated communications, and associated processing at the server (e.g., 904, 906, 908) are transparent to the client application, process, and/or module that sent the service request.

Another example of a client side script is one used to redirect a request, transparently to the requesting client. In some embodiments, a first service S1 may redirects a requesting client C's request to a second service S2, transparently to the client C, by returning to the client C in response to the request a client side script. An interceptor or other entity at the client side configured to recognize that the script is present causes the script to be run prior to handing the service response to the requesting client application or other process. The script then sends the same request directly to the second service S2, receives a response from S2, and causes the response to be handed to the requesting client application and/or process in a manner that makes it appear to the requesting client application and/or process that the response came directly from the first service S1 in response to the original request.

In some embodiments, a client may be configured to include in a service request or an associated communication a client side script to be returned to the client in and/or with a service response, to be executed at the client on and/or otherwise with respect to the service response. For example, a client may include and/or send in connection with a service request a client side script that will enable the client to decompress, decrypt, and/or otherwise properly post-process the service response when received.

In some embodiments, a chain, tree, or other combination or sequence of services may be invoked and a client and/or intermediate node in the chain may include in a service request and/or response a script configured to enable a downstream node to perform process it may not otherwise be able to perform, such as to decompress and/or decrypt data.

In various embodiments, a client and/or server side script may be used to prompt a human interaction, e.g., via a user interface, and/or to process an input received via such a human interaction. In this way, the machine-to-machine paradigm of a web services or similar interaction can be departed from selectively and as required to enhance the services made available via such services.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of processing data, comprising:
sending, from a client, a service request to a service, wherein fulfillment of the service request by the service requires configuration at the client to comply with one or more requirements associated with a policy;
receiving, at the client, a communication from the service that includes a script sent by the service in response to the service request, wherein the service is configured to include the script in the communication based at least in part on a determination that fulfillment of the service request requires client configuration to comply with the one or more requirements associated with the policy, and wherein the script is configured to determine, when executed, whether client configuration complies with the one or more requirements associated with the policy; and
executing the script at the client to determine whether the configuration at the client complies with the one or more requirements associated with the policy.

2. A method as recited in claim 1, wherein the script is included in a service response sent by the service to the client in response to the service request.

3. A method as recited in claim 1, wherein the script performs one or more of the following types of post-processing on at least a portion of a response data included in a service response sent by the service to the client in response to the service request: decompressing; unzipping; and decrypting.

4. A method as recited in claim 1, wherein the script is sent prior to a service response being sent by the service to the client in response to the service request.

5. A method as recited in claim 1, wherein the one or more requirements associated with the policy include requires that the client be configured to store in a prescribed manner a content data requested in the service request.

6. A method as recited in claim 1, wherein the one or more requirements associated with the policy requires include that the client be associated with a client host located in a prescribed physical location in order for the service requested in the service request to be performed.

7. A method as recited in claim 1, wherein the client is associated with a client side services runtime environment.

8. A method as recited in claim 1, wherein the script is executed by a scripting extension associated with a client side services runtime environment.

9. A method as recited in claim 1, wherein the receipt and execution of the script is transparent to a client application or other client process that generated the service request.

10. A method as recited in claim 1, wherein the service comprises a first service and the script is further configured to redirect the service request to a second service.

11. A method as recited in claim 10, wherein the redirection occurs transparently to a client application or other client process that generated the service request.

12. A method as recited in claim 1, wherein the script comprises one or more of the following types of script: Python, JavaScript, Ruby, and Visual Basic.

13. A method as recited in claim 1, wherein the script is limited to invoking code included in a prescribed library.

14. A system, comprising:
a client communication interface configured to:
send a service request to a service, wherein fulfillment of the service request by the service requires configuration at the client to comply with one or more requirements associated with a policy;
receive a communication from the service that includes a script sent by the service in response to the service request, wherein the service is configured to include the script in the communication based at least in part on a determination that fulfillment of the service request requires configuration at the client to comply with the one or more requirements associated with the policy, and wherein the script is configured to determine, when executed, whether configuration at the client complies with the one or more requirements associated with the policy; and
a processor coupled to the client communication interface and configured to execute the script at the client, wherein the script is executed to determine whether the configuration at the client complies with the one or more requirements associated with the policy.

15. A service consumer host computer as recited in claim 14, wherein the script is included in a service response sent by the service in response to the service request.

16. A service consumer host computer as recited in claim 14, wherein the script is included in a communication sent by the service prior to performing or completing a service requested in the service request.

17. A computer program product embodied on a non-transitory computer readable medium and comprising computer instructions for:
sending, from a client a service request to a service, wherein fulfillment of the service request by the service requires configuration at the client to comply with one or more requirements associated with a policy;
receiving, at the client, a communication from the service that includes a script sent by the service in response to the service request, wherein the service is configured to include the script in the communication based at least in part on a determination that fulfillment of the service request requires client configuration to comply with the one or more requirements associated with the policy, and wherein the script is configured to determine, when executed, whether client configuration complies with the one or more requirements associated with the policy; and
executing the script at the client to determine whether the configuration at the client complies with the one or more requirements associated with the policy.

18. A method as recited in claim 1, wherein the script is further configured to determine whether an associated client runtime environment includes a scripting extension.

* * * * *